United States Patent
Ezrielev et al.

(10) Patent No.: US 11,507,447 B1
(45) Date of Patent: Nov. 22, 2022

(54) SUPERVISED GRAPH-BASED MODEL FOR PROGRAM FAILURE CAUSE PREDICTION USING PROGRAM LOG FILES

(71) Applicant: Dell Products L.P., Round Rock, TX (US)

(72) Inventors: Ofir Ezrielev, Be'er Sheva (IL); Nadav Azaria, Meitar (IL); Avitan Gefen, Tel Aviv (IL)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/507,829

(22) Filed: Oct. 22, 2021

(51) Int. Cl.
| | |
|---|---|
| *G06F 11/00* | (2006.01) |
| *G06F 11/07* | (2006.01) |
| *G06F 11/30* | (2006.01) |
| *G06N 3/04* | (2006.01) |
| *G06F 11/36* | (2006.01) |
| *G06F 11/34* | (2006.01) |

(52) U.S. Cl.
CPC ...... *G06F 11/0772* (2013.01); *G06F 11/3006* (2013.01); *G06F 11/3075* (2013.01); *G06F 11/3447* (2013.01); *G06F 11/3457* (2013.01); *G06F 11/3636* (2013.01); *G06F 11/3648* (2013.01); *G06N 3/04* (2013.01)

(58) Field of Classification Search
CPC .... G06F 11/079; G06F 11/30; G06F 11/3058; G06F 11/3409; G06F 11/3452; G06F 11/324; G06F 11/3051
See application file for complete search history.

(56) References Cited

U.S. PATENT DOCUMENTS

| | | | | |
|---|---|---|---|---|
| 2015/0288557 A1* | 10/2015 | Gates | ........... | G06F 11/0709 714/37 |
| 2016/0179598 A1* | 6/2016 | Lvin | ........... | H04L 41/22 714/48 |
| 2021/0243212 A1* | 8/2021 | Bowman | ........... | H04L 63/0876 |

OTHER PUBLICATIONS

Zhang, Chuxu et al. "Heterogeneous graph neural network," Proceedings of the 25th ACM SIGKDD International Conference on Knowledge Discovery & Data Mining, Aug. 4-8, 2019, https://dl.acm.org/doi/abs/10.1145/3292500.3330961.

* cited by examiner

*Primary Examiner* — Charles Ehne
(74) *Attorney, Agent, or Firm* — Terrile, Cannatti & Chambers, LLP; Emmanuel A. Rivera (57) ABSTRACT

Described are computer-implementable method, system and computer-readable storage medium for supervised graph-based model for prediction of program failure using program log files. Using log file from a running program application, a log file graph is created. Node-level labels are adding to the log file graph, where the labels include an indication of first failure. The node-level labeled log file graph is processed by a graph neural network (GNN) and predictions are provided as to program cause of failure or first failure indication of other log file graphs based on the GNN processed node-level labeled log file graph.

20 Claims, 5 Drawing Sheets

SUPERVISED GRAPH-BASED MODEL FOR PROGRAM FAILURE CAUSE PREDICTION USING PROGRAM LOG FILES

BACKGROUND OF THE INVENTION

Field of the Invention

The present invention relates to information handling systems. More specifically, embodiments of the invention provide for a supervised graph-based model for prediction of program failure using program log files.

Description of the Related Art

As the value and use of information continues to increase, individuals and businesses seek additional ways to process and store information. One option available to users is information handling systems. Information handling systems include personal computers (PC), server computers, desktop computers, notebooks, laptops, etc. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Computer programs or programs running on information handling systems are ever increasing in complexity. This increase in complexity can lead to difficulties in asserting program correctness. In certain instances, a program may misbehave, either by a program failure or by reacting unexpectedly to a certain input. Furthermore, a program may be hacked, causing various negative consequences.

An important tool to identify the root causes of the mentioned misbehavior is a program's log file, which records the program's actions. After identifying the root cause, the program's developer/owner may proceed with fixing the relevant issues in the program. Using the program's log file can be a great resource, reviewing of the log file to determine program misbehavior issues can be time and resource consuming.

Program log files may be presented in sequence form, either as a time series process or as programming language text. Such presentations can have drawbacks in using the log program log files for determining program misbehavior issues. Consecutive rows in the program log file may come from different processes, and share no causal relationship. The rows in the log file may be structured in such a way that a simple segmentation is enough to extract all its relevant information and processing by a language model provides no benefits. Sequences fail to represent complex modes of interaction that exist in complex programs, such as multi-threading.

SUMMARY OF THE INVENTION

A computer-implementable method, system and computer-readable storage medium for supervised graph-based model for prediction of program failure using program log files comprising: generating a program log file from a running program application; creating a log file graph based on the generated program log file; adding node-level labels to the created log file graph, including a label indicating first failure; processing through a graph neural network (GNN) the node-level labeled log file graph; and providing predictions as to program cause of failure or first failure indication of other log file graphs, based on the GNN processed node-level labeled log file graph.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Various implementations provide a supervised graph-based models for computer program (program failure) cause prediction using program log files. The analysis of log files implements the use of a log file graph to represent a log file. Supervised learning is provided by labeling nodes of a log file graph as to whether a log row is a first indicator of program failure. Initial or first indicators of program failure can be implemented using a graph neural network or GNN which uses labeled log file graphs to perform predictions for first failure for new program run log file graphs.

Graph representation and the use of GNN can enable for better predictions of first indicators of program failure, and can lead to the reduction of time and resources in current log file analysis used to find root causes of a program's failure using the failure, and can lead to more accurate analysis. The described analysis herein supports program maintenance and can reduce the time and resources of program developers/owners in program failure analysis and fixes, including timelier program fixes.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, gaming, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a microphone, keyboard, a video display, a mouse, etc. The information handling system may also include one or more buses operable to transmit communications between the various hardware components.

Figure 1:
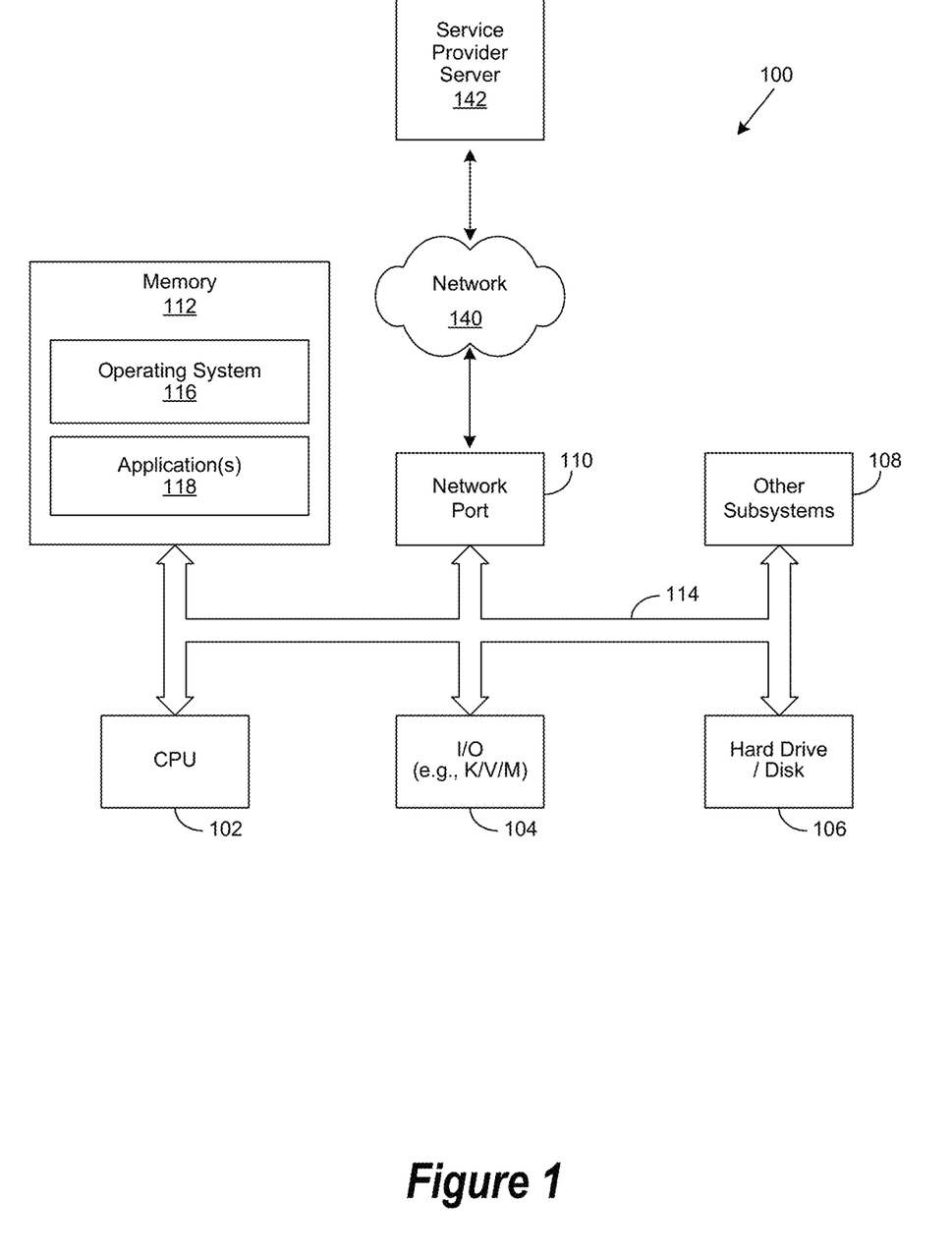
FIG. 1 is a general illustration of components of an information handling system as implemented in the present invention.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a microphone, a keyboard, a video/display, a mouse, and associated controllers (e.g., K/V/M), a hard drive or disk storage 106, and various other subsystems 108.

In various embodiments, the information handling system 100 also includes network port 110 operable to connect to a network 140, where network 140 can include one or more wired and wireless networks, including the Internet. Network 140 is likewise accessible by a service provider server 142. The information handling system 100 likewise includes system memory 112, which is interconnected to the foregoing via one or more buses 114. System memory 112 can be implemented as hardware, firmware, software, or a combination of such. System memory 112 further includes an operating system (OS) 116. Embodiments provide for the system memory 112 to include applications 118. In certain implementations, the information handling system 100 may access use of the applications 118 from an external source, such as a website (e.g., online or remote applications).

A graph $\mathcal{G} = (\mathcal{V}, \varepsilon)$ is a mathematical structure, constituting a set of object nodes $\mathcal{V}$ and edge relations between those objects $\varepsilon$. Graphs are useful data structures that can be used to generalize the representation of complex systems, with the feature space for the object nodes and edges. In addition, various algorithms can used to analyze graphs.

Graph representations are more versatile than sequence representations since graphs can provide a generalization over objects and their interactions. This versatility enables better generalization capabilities for methods that utilize them. In graphs, another form of connection can be added between two log rows with a graph representation, in addition to new kinds of log rows.

Heterogeneous graphs can include object nodes and edges of different types, and can represent a system, including runs of complex computer programs (programs). Such graphs can be used to represent the interactions between different components of the program in a full and interpretable way.

Figure 2:
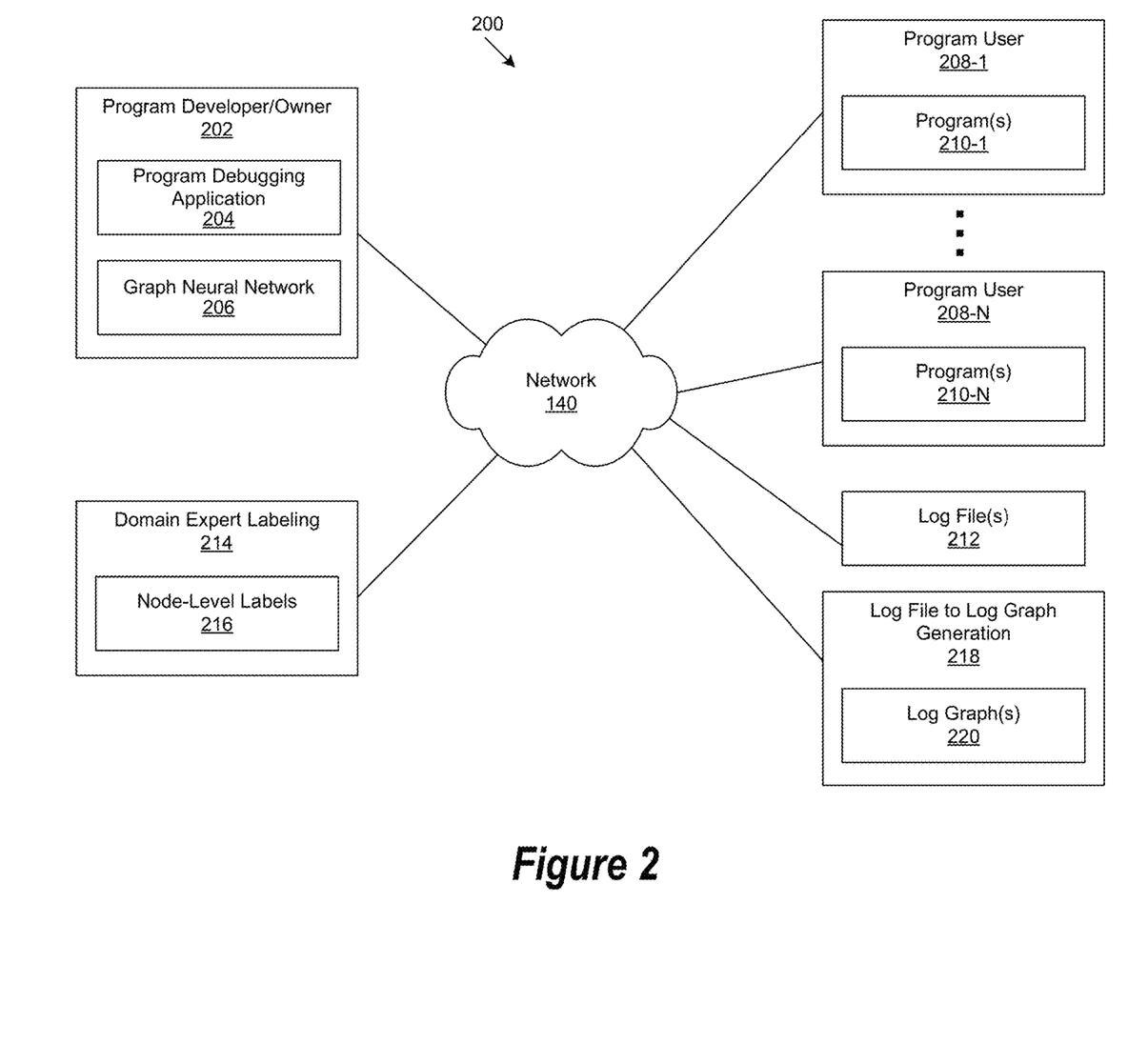
FIG. 2 illustrates a system for a graph-based model for prediction of program failure using program log files.

FIG. 2 shows a system for a graph-based model for prediction of program failure using program logs. The system 200 includes program developer/owner 202 representing developers and owners of programs to be analyzed and fixed as to relevant issues of the programs. Program developer/owner 202 represent devices and may be implemented as an information handling system 100 described in FIG. 1.

Implementations provide for the program developer/owner 202 to include a program debugging application 204 and a graph neural network (GNN) 206. In various embodiments, program debugging application 204 and a GNN 206 are included in memory, such as memory 112, and particularly included as applications 118 of information handling system 100. Implementations provide for the program developer/owner 202 to be connected to the network 140 described in FIG. 1.

The system 200 further includes one or more program users 208-1 to 208-N. Program users 208-1 to 208-N represent devices and may be implemented as an information handling system 100 described in FIG. 1. Implementations provide for the program users 208-1 to 208-N to include respective program(s) 210-1 to 210-N. Implementations provide for the program users 208-1 to 208-N to be connected to the network 140 described in FIG. 1.

The program(s) 210-1 to 210-N are continuously running on the program users 208-1 to 208-N. As the program(s) 210-1 to 210-N run, log files 212 can be generated. Implementations provide for the log file(s) 212 to be included/stored in program users 208-1 to 208-N, and as shown in FIG. 2, the log file(s) 212 can be received and stored in a separate location(s), such as database as accessible through the network 140 described in FIG. 1.

The system 200 can include domain expert labeling 214. The domain expert labeling 214 represent devices and may be implemented as an information handling system 100 described in FIG. 1. The domain expert labeling 214 receives label input from domain experts as for log file graphs as further described herein.

Implementations provide for the program users 208-1 to 208-N to be connected to the network 140 described in FIG. 1. Implementations provide for the domain expert labeling 214 to generate node-level labels 216. The node-level labels 216 can be added to the log file(s) 212 and are used in the analysis methods described herein.

The system 200 further can include log file to log file graph generation 218. Implementations provide for the log file to log file graph generation 218 to be included in program developer/owner 202 or in program users 208-1 to 208-N, such as an application 118 in memory 112 in information handling system 100 as described in FIG. 1. As shown in FIG. 2, the log file to log file graph generation 218 can be implemented separate from program developer/owner 202 and program users 208-1 to 208-N.

Implementations provide for log file to log graph generation 218 to create log file graph(s) 220 from log file(s) 212. Furthermore, the node-level labels 216 can be added to log file(s) 212. Log file graph(s) 220 and the log file(s) 212 with node node-level labels 216 can be processed by the GNN 206 to provide cause of failure prediction. Cause of failure prediction can be received by the program debugging application 204.

Figure 3:
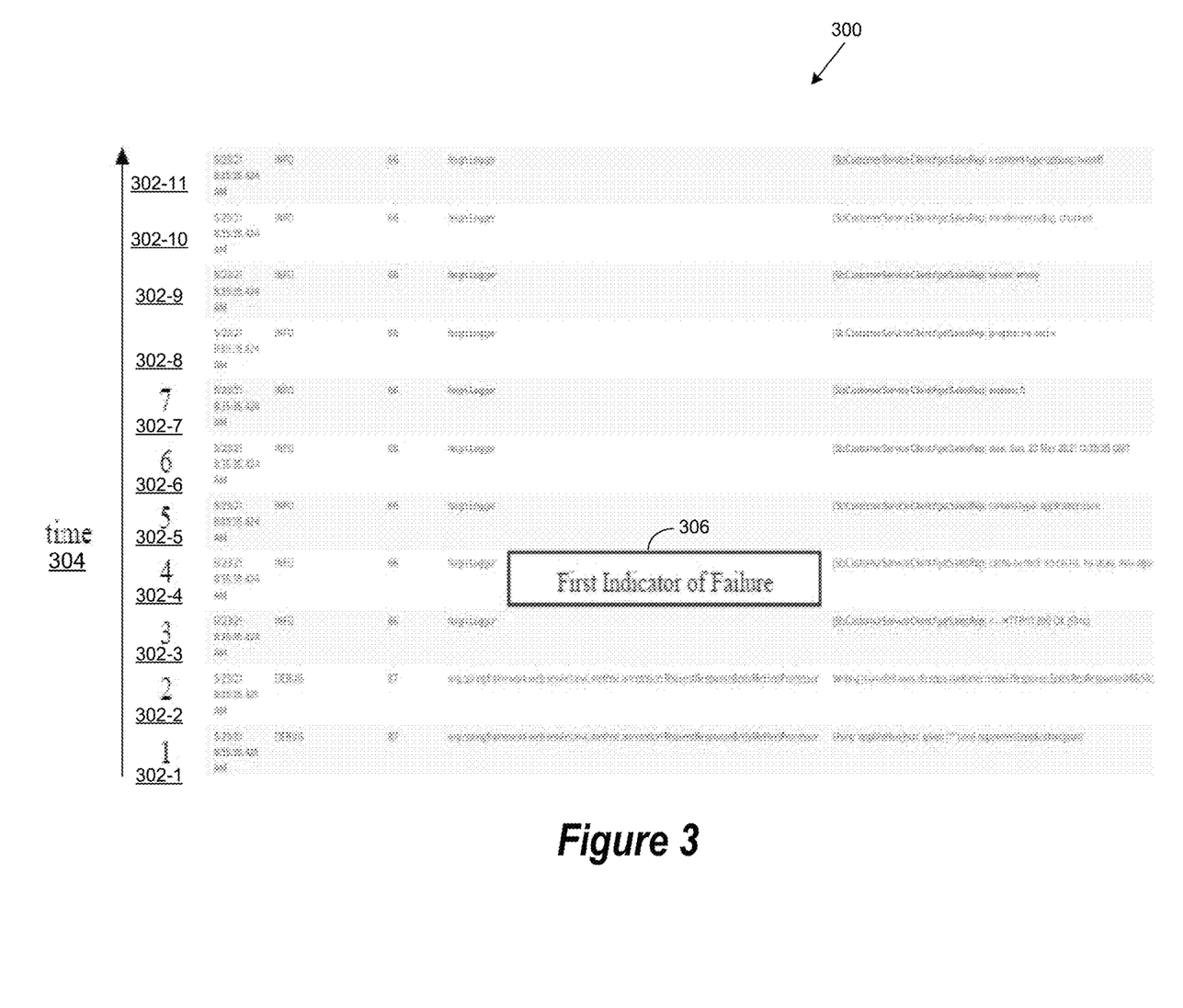
FIG. 3 illustrates a program log file.

FIG. 3 illustrates a program log file. The program log file 300 can be one of the log file(s) 212 described in FIG. 2. As discussed, the log file(s) 212 (e.g., program log file 300) are generated as program(s) 210-1 to 210-N are ran. In general, log file 300 is a file that includes a registry of events, processes, messages and communication between various communicating software applications, such as programs 210 and an operating system that implements such application/programs 210. Log file 300 can be present in executable software files, the operating system, and programs 210, and messages and programs 210. The executable software files can produce the log file 300 where activities are noted/recorded.

The log file 300 includes log file rows or lines 302 (log rows 302) that are plotted against time 304. The log rows 302 can include the events, processes, messages and communication described above. In this example, at log file row or line 4 represented by 304-4, a first indicator of failure 306 is shown.

The log rows 302 include features. Features types can include the following. A feature type (type 1) can be program components participating in the creation of a log rows 302. Program components can include, and are not limited to, program functions and their parameters, an entity of the machine/device running the process/program 210 that generated the log rows 302, and the last log row 302 created by the same thread. Another feature type (type 2) can be system state at the time of writing for a log row(s) 302. System state can include, and is not limited to, an existence of system failure and its type, resource usage and system load, As further described herein, the features of the log rows 302 are extracted. Implementations provide for log rows 302 to be constructed or built using a parsable format, such as JSON. Such a format or data structure can allow for features to be extracted.

Figure 4:
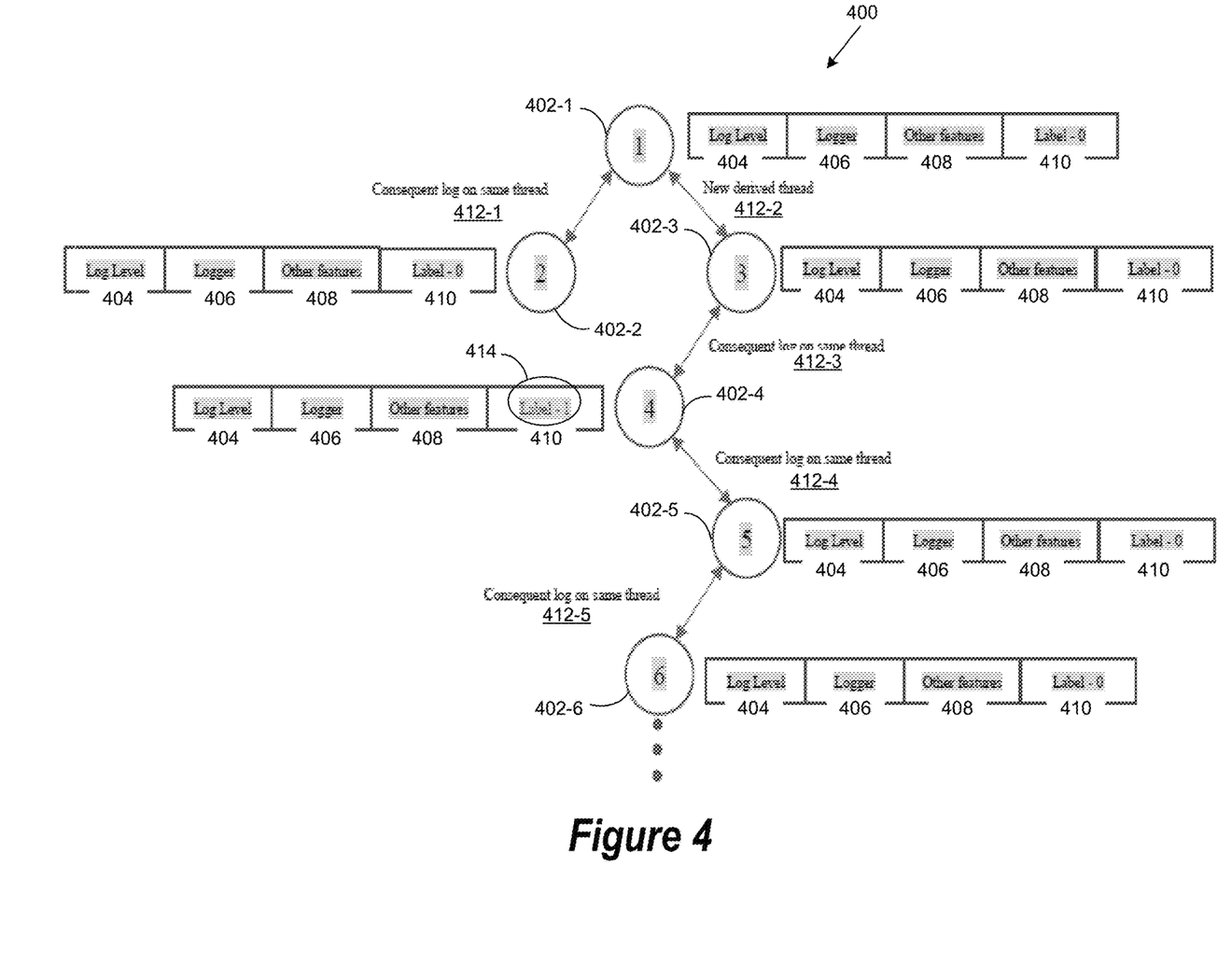
FIG. 4 illustrates a program log file graph representing a program log file.

FIG. 4 shows program log file graph representing a program log file. Implementations provide for the program log file graph or log file graph 400 to be built as a representation of a run of a program 210 from the log file 300 (log file(s) 212). In particular, the log file graph 400 is constructed as log row-based graph. The nodes 402 represent rows 302 of the log file 300. In this example, "node 1" 402-1 represents "log row 1" 302-1; "node 2" 402-2 represents "log row 2" 302-2; "node 3" 402-3 represents "log row 3" 302-3; "node 4" 402-4 represents "log row 4" 302-4; "node 5" 402-5 represents "log row 5" 302-5; and "node 6" 402-6 represents "log row 6" 302-6.

A node 402 provides for a data structure that includes log level 404, logger 406, other features 408, and label 410. Implementations provide for log file graph 400 to have features (other features 408) of a node 402 to be of feature type of "system state" or "type 2" as described as to extracted features of log rows 302. Edges 412 of the log file graph 400 correspond to interactions as inferred by extracted feature type of "program components" or "type 1" as described as to extracted features of log rows 302. As shown in FIG. 4, nodes 402 are connected with edges 412 indicating "consequent log (rows) on same thread". Edges 412 indicating "new derived thread" do not have connecting nodes 412.

Referring back to FIG. 2, domain expert labelling 214 provides node-level labels 216. Implementations include a domain expert to provide such labels as part of supervised learning. A label can indicate whether a log row is a first indicator of a program failure. Referring to FIG. 3, first indicator of failure 306 is evident at "log row 4" 302-4. Referring now to FIG. 4, a "Label-1" 414 in field 410 of "node 4" 402-4 is added representing a first indicator of program failure.

Referring back to FIG. 2, the GNN 206 is trained on the log graphs 220 which are log graphs that have node-level labels, such as log file graph 400. GNN 206 is particularly considered as supervised, because of the use of domain expert labeling provides for learning and prediction of first failure for new program run log file graph representations. As described, cause of failure prediction can be received by the program debugging application 204. Such predictions can allow program developers to look at a single or a few log rows 302 to analyze cause of failure, instead of looking over an entire log file(s) 212 (e.g., log file 300).

Figure 5:
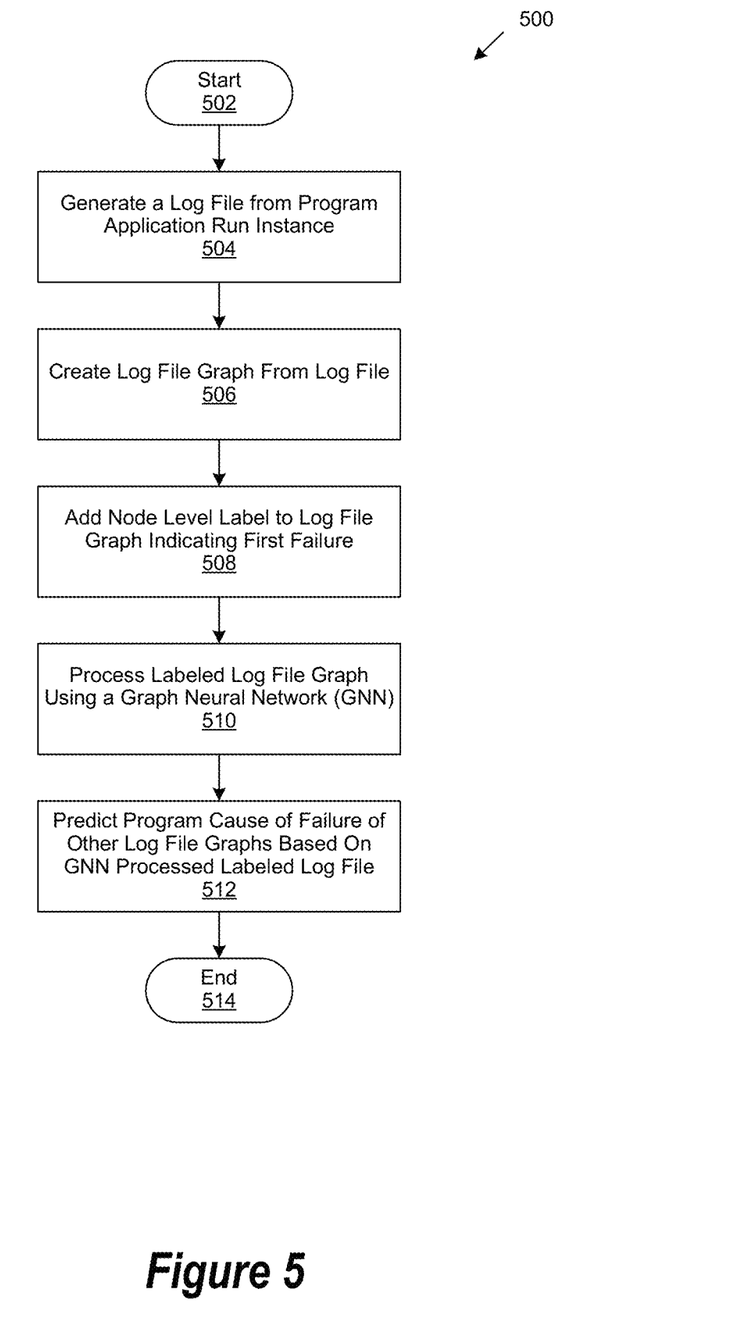
FIG. 5 is a generalized flowchart for supervised graph-based model for prediction of program failure using program log files.

FIG. 5 is a generalized flowchart for supervised graph-based model for prediction of program failure using program log files. The order in which the method is described is not intended to be construed as a limitation, and any number of the described method blocks may be combined in any order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the invention. Implementations provide for the process 500 to be performed by an information handling system 100 as described in FIG. 1.

At step 502, the process 500 starts. At step 504, from a running program application or applications, such as programs 210 described herein, a log file is generated, such as log file(s) 212 and log file 300 described herein.

At step 506, a log file graph is created, such as log file graph(s) 220 and log file graph 400 described herein. Implementations provide for log file to log file graph generation 218 described herein to create the log file graph.

At step 508, node-level labeling is added to the log file graph, and particularly labeling indicating first failure. Implementations provide for the domain expert labeling 214 to generate node-level labels 216, receiving label input from a domain expert. In this sense, supervised learning is provided.

At step 510, the labeled log file graph is processed using a graph neural network (GNN), such as GNN 206 described herein. At step, 512 prediction is performed of program cause of failure or first failure indication of other log file graphs, based on the processed label log file graph. At step 514, the process 500 ends.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only and are not exhaustive of the scope of the invention.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random-access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object-oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or step diagrams of methods, apparatus (systems) and computer program products according to embodiments of the invention. It will be understood that each step of the flowchart illustrations and/or step diagrams, and combinations of steps in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram step or steps.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only and are not exhaustive of the scope of the invention.

Consequently, the invention is intended to be limited only by the spirit and scope of the appended claims, giving full cognizance to equivalents in all respects.

What is claimed is:

1. A computer-implementable method for supervised graph-based model for prediction of program failure using program log files comprising:
   generating a program log file from a running program application;
   creating a log file graph based on the generated program log file;
   adding node-level labels to the created log file graph, including a label indicating first failure;
   processing through a graph neural network (GNN) the node-level labeled log file graph; and
   providing predictions as to program cause of failure or first failure indication of other log file graphs, based on the GNN processed node-level labeled log file graph.

2. The computer-implementable method of claim 1, wherein the log file includes log row features defined by feature types of type 1 program components participating in the creation of a log rows and of type 2 system state at the time of writing to a log row.

3. The computer-implementable method of claim 1, wherein the creating of the log file graph includes extracting parsable features of log rows of the log file.

4. The computer-implementable method of claim 1, wherein the nodes of the node-level labeled log file graph represent rows of the created log file graph.

5. The computer-implementable method of claim 1, wherein features of nodes of the node-level labeled log file graph are of type 2 system state as to extracted features of log rows of the program log file, and edges of the node-level labeled log file graph are of type 1 as to extracted feature type of program components that correspond to interactions.

6. The computer-implementable method of claim 1, wherein node-level labels are provided from a domain expert.

7. The computer-implementable method of claim 1, wherein a debugging application provides the prediction.

8. A system comprising:
   a processor;
   a data bus coupled to the processor; and
   a non-transitory, computer-readable storage medium embodying computer program code, the non-transitory, computer-readable storage medium being coupled to the data bus, the computer program code interacting with a plurality of computer operations for supervised graph-based model for prediction of program failure using program log files and comprising instructions executable by the processor and configured for:
   generating a program log file from a running program application;
   creating a log file graph based on the generated program log file;
   adding node-level labels to the created log file graph, including a label indicating first failure;
   processing through a graph neural network (GNN) the node-level labeled log file graph; and
   providing predictions as to program cause of failure or first failure indication of other log file graphs, based on the GNN processed node-level labeled log file graph.

9. The system of claim 8, wherein the log file includes log row features defined by feature types of type 1 program components participating in the creation of a log rows and of type 2 system state at the time of writing to a log row.

10. The system of claim 8, wherein the creating of the log file graph includes extracting parsable features of log rows of the log file.

11. The system of claim 8, wherein the nodes of the node-level labeled log file graph represent rows of the created log file graph.

12. The system of claim 8, wherein features of nodes of the node-level labeled log file graph are of type 2 system state as to extracted features of log rows of the program log file, and edges of the node-level labeled log file graph are of type 1 as to extracted feature type of program components that correspond to interactions.

13. The system of claim 8, wherein node-level labels are provided from a domain expert.

14. The system of claim 8, wherein a debugging application provides the prediction.

15. A non-transitory, computer-readable storage medium embodying computer program code, the computer program code comprising computer executable instructions configured for:
   generating a log file from a running program application;
   creating a log file graph based on the generated log file;
   adding node-level labels to the created log file graph, including a label indicating first failure;
   processing through a graph neural network (GNN) the node-level labeled log file graph; and
   providing predictions as to program cause of failure or first failure indication of other log file graphs, based on the GNN processed node-level labeled log file graph.

16. The non-transitory, computer-readable storage medium of claim 15, wherein the log file includes log row features defined by feature types of type 1 program components participating in the creation of a log rows and of type 2 system state at the time of writing to a log row.

17. The non-transitory, computer-readable storage medium of claim 15, wherein the creating of the log file graph includes extracting parsable features of log rows of the log file.

18. The non-transitory, computer-readable storage medium of claim 15, wherein the nodes of the node-level labeled log file graph represent rows of the created log file graph.

19. The non-transitory, computer-readable storage medium of claim 15, wherein features of nodes of the node-level labeled log file graph are of type 2 system state as to extracted features of log rows of the program log file, and edges of the node-level labeled log file graph are of type 1 as to extracted feature type of program components that correspond to interactions.

20. The non-transitory, computer-readable storage medium of claim 15, wherein node-level labels are provided from a domain expert.

* * * * *